United States Patent
Chuang et al.

(10) Patent No.: US 12,045,031 B2
(45) Date of Patent: Jul. 23, 2024

(54) THERMAL COMPENSATION SYSTEM FOR MACHINE TOOLS WITH A MINIMUM CONTROL PRECISION

(71) Applicant: Industrial Technology Research Institute, Hsinchu (TW)

(72) Inventors: Chia-Chin Chuang, Kaohsiung (TW); Chin-Ming Chen, Taichung (TW); Chun-Yu Tsai, New Taipei (TW); Chi-Chen Lin, Taichung (TW); Chung-Kai Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 315 days.

(21) Appl. No.: 17/684,666

(22) Filed: Mar. 2, 2022

(65) Prior Publication Data
US 2023/0185270 A1    Jun. 15, 2023

(30) Foreign Application Priority Data
Dec. 15, 2021  (TW) .................. 110146948

(51) Int. Cl.
*G05B 99/00*    (2006.01)
*B23Q 17/20*    (2006.01)
(Continued)

(52) U.S. Cl.
CPC ........... *G05B 19/404* (2013.01); *B23Q 17/20* (2013.01); *B23Q 23/00* (2013.01); *G05B 19/41885* (2013.01); *G05B 2219/49219* (2013.01)

(58) Field of Classification Search
CPC .......................................... G05B 2219/49219
See application file for complete search history.

(56) References Cited

U.S. PATENT DOCUMENTS 10,088,826 B2    10/2018  Jalluri et al.
10,365,633 B2     7/2019  Jalluri et al.
(Continued)

FOREIGN PATENT DOCUMENTS

BR    102015019898 A2    6/2016
CN       102166722 B     3/2013
(Continued)

OTHER PUBLICATIONS

J. S. Chen et al., "Thermal error modelling for real-time error compensation", 1996, pp. 266-275, Int J Adv Manuf Technol.
(Continued)

*Primary Examiner* — Suresh Suryawanshi
(74) *Attorney, Agent, or Firm* — WPAT, P.C.

(57) ABSTRACT

A thermal compensation system for machine tools includes a thermal compensation-monitoring device and a cloud processing device. The thermal compensation-monitoring device receives a plurality of temperature signals of a workpiece and corresponding processing tolerance data to build or update a thermal compensation database. The cloud processing device provides a thermal compensation model, and applies the model with the characterized temperature signals and the tolerance data to generate a compensation value so as to decide whether or not to modify the model or to run a compensation is necessary.

10 Claims, 2 Drawing Sheets

(51) Int. Cl.
  B23Q 23/00 (2006.01)
  G05B 19/404 (2006.01)
  G05B 19/418 (2006.01)

(56) References Cited

U.S. PATENT DOCUMENTS

| | | | |
|---|---|---|---|
| 10,592,824 B2 | 3/2020 | Watanabe | |
| 10,852,710 B2 | 12/2020 | Saeki | |
| 2010/0152881 A1* | 6/2010 | Ou | G05B 19/404 700/174 |
| 2013/0004256 A1* | 1/2013 | Wu | B23Q 15/18 409/80 |
| 2019/0011898 A1* | 1/2019 | Saeki | G05B 13/027 |
| 2019/0171176 A1* | 6/2019 | Ma | G05B 19/18 |
| 2021/0055240 A1* | 2/2021 | Konishi | G05B 13/0265 |
| 2021/0396821 A1* | 12/2021 | Ellis, Jr. | G01R 33/072 |

FOREIGN PATENT DOCUMENTS

| | | | | |
|---|---|---|---|---|
| CN | 103984287 A | 8/2014 | | |
| CN | 108629419 A | 10/2018 | | |
| CN | 109070295 A | 12/2018 | | |
| CN | 109085797 A | 12/2018 | | |
| CN | 109613886 A | 4/2019 | | |
| CN | 109799782 A | 5/2019 | | |
| CN | 105389455 B | 7/2019 | | |
| CN | 111045386 A | 4/2020 | | |
| CN | 109202538 B | 9/2020 | | |
| CN | 109308051 B | 10/2020 | | |
| CN | 108214087 B | 6/2021 | | |
| CN | 113591395 A * | 11/2021 | | G06F 30/27 |
| DE | 102015113510 A1 | 2/2016 | | |
| DE | 102018115413 A1 | 1/2019 | | |
| DE | 102018005858 A1 | 3/2019 | | |
| JP | 4891104 B2 | 3/2012 | | |
| JP | 6538772 B2 | 7/2019 | | |
| RU | 2699885 C2 | 9/2019 | | |
| TW | 201021959 | 6/2010 | | |
| TW | I459166 B | 11/2014 | | |
| TW | I521318 B | 2/2016 | | |
| TW | I556075 | 11/2016 | | |
| TW | I556075 B | 11/2016 | | |
| TW | I649648 | 2/2019 | | |
| TW | I652560 B | 3/2019 | | |

OTHER PUBLICATIONS

Philip Blaser et al., "Adaptive learning control for thermal error compensation of 5-axis machine tools", Accepted Mar. 3, 2017 Available online Apr. 29, 2017, pp. 302-309, Journal of Manufacturing Systems 44 (2017).

Ali M. Abdulshahed et al., "The application of ANFIS prediction models for thermal error compensation on CNC machine tools", Accepted Nov. 13, 2014 Available online Nov. 21, 2014, pp. 158-168, Applied Soft Computing 27 (2015).

Wu Hao et al., "Thermal error optimization modeling and real-time compensation on a CNC turning center", Accepted Dec. 15, 2007, pp. 172-179, journal of materials processing technology 2 0 7 ( 2 0 0 8 ).

Yang Li et al., "A review on spindle thermal error compensation in machine tools", pp. 20-38, Accepted Apr. 14, 2015 Available online Apr. 24, 2015, International Journal of Machine Tools & Manufacture 95 (2015).

Josef Mayr et al., "An adaptive self-learning compensation approach for thermal errors on 5-axis machine tools handling an arbitrary set of sample rates", 2018, pp. 551-554, Published by Elsevier Ltd on behalf of CIRP.

Jianguo Yang et al., "Thermal error mode analysis and robust modeling for error compensation on a CNC turning center", pp. 1367-1381, 1999 Elsevier Science Ltd. All rights reserved.

TW OA issued on Aug. 3, 2022.

* cited by examiner

THERMAL COMPENSATION SYSTEM FOR MACHINE TOOLS WITH A MINIMUM CONTROL PRECISION

CROSS REFERENCE TO RELATED APPLICATION

This application claims the benefits of Taiwan application Serial No. 110146948, filed on Dec. 15, 2021, the disclosures of which are incorporated by references herein in its entirety.

TECHNICAL FIELD

The present disclosure relates in general to a thermal compensation system for machine tools that can connect various machine tools at different locations for running a thermal compensation process.

BACKGROUND

In recent years, with rapid development of machine tools, the demand for product precision has increased. However, inevitable geometrical difference between the manufacturing site of machine tools and the sales sites thereof will somehow decrease the precision of machine tools in the market due to different ambient temperatures, processing time, etc. Fortunately, a thermal compensation technology is introduced to solve this problem, and thus becomes one of the main development trend in the art of manufacturing the machine tools.

The thermal compensation technology usually performs a modeling process before a regular manufacturing line of the machine tools can be built. However, if the product machine tools are sold to different latitude and longitude regions, the manufacturer's accuracy will be distorted due to local climate differences. That is, the same set of thermal compensation tools and numbers cannot be applied to different regions. Therefore, how to provide a thermal compensation system for machine tools to improve the aforesaid problems will be an urgent issue to the skilled in the art.

SUMMARY

An object of the present disclosure is to provide a thermal compensation system for machine tools that online thermal compensation can be performed in real time, and the established neural network thermal compensation model can be continuously modified, so that, when the machine tools are sold to different regions, the problem of specific instruments, equipment and special personnel required for remodeling can be resolved.

In one embodiment this disclosure, a thermal compensation system, applied to a machine tool for processing a workpiece, includes a thermal compensation-monitoring device and a cloud calculation device. The thermal compensation-monitoring device is configured to receive a plurality of temperature signals of the workpiece at different timings, to capture a plurality of temperature characteristics corresponding to the plurality of temperature signals, and to build or update a thermal compensation database according to a plurality of tolerance data of the workpiece corresponding to the plurality of temperature characteristics. The cloud calculation device is configured to provide a thermal compensation model, to calculate a thermal compensation value according to the plurality of temperature characteristics and the plurality of tolerance data, and to evaluate the thermal compensation value and a preset threshold value and then determine to modify the thermal compensation model or to perform a thermal compensation process.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
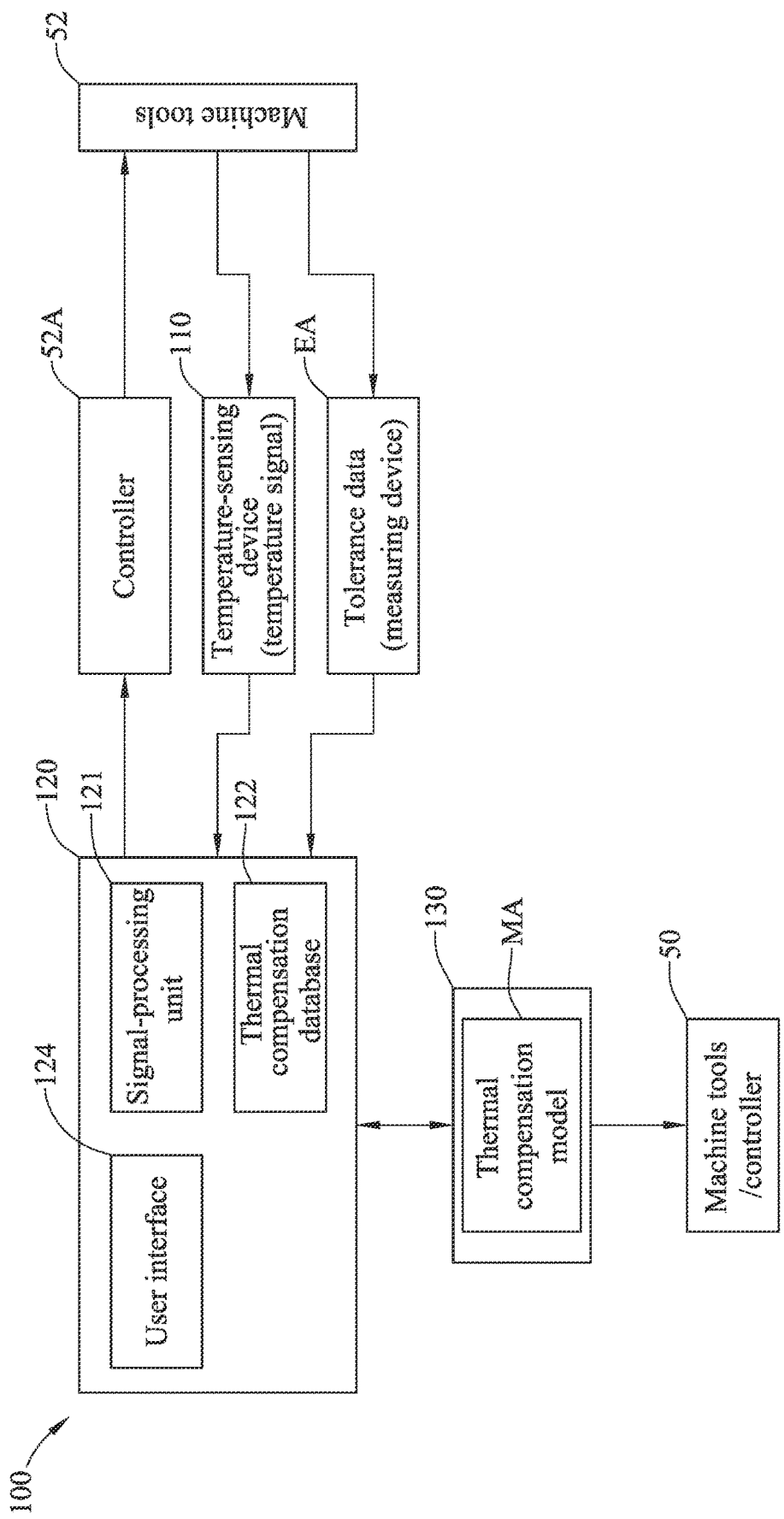
FIG. 1 is a schematic view of an embodiment of the thermal compensation system for machine tools in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a schematic view of an embodiment of the thermal compensation system for machine tools in accordance with this disclosure is shown. In this embodiment, the thermal compensation system for machine tools 100 is applicable to machine tools and controllers at different sites but signally connected together. For example, as shown in FIG. 1, a local or near-end machine tool 52 and at least one distant or far-end machine tool 50 are demonstrated, but not limited thereto. The thermal compensation system for machine tools 100 can include a thermal compensation-monitoring device 120 and a cloud calculation device 130, and is further connected with a temperature-sensing device 110 and at least one measuring device (not shown in the figure). The temperature-sensing device 110 can be disposed beside the machine tools 52. When the machine tool 52 is machining a workpiece, the temperature-sensing device 110 would measure temperatures of the workpiece at different timings. In this disclosure, the temperature-sensing device 110 can be a temperature sensor, a thermal image, or any detector that can measure or record the temperatures of the workpiece at specific timings. In addition, by utilizing a dial gage, a displacer, or any contact or non-contact measuring device, machining precision, thermal distortion and any tolerance data EA of the workpiece can be detected simultaneously. All these tolerance data EA as well as temperature signals provided by the temperature-sensing device 110 can be transmitted together to the thermal compensation-monitoring device 120.

In this disclosure, the thermal compensation-monitoring device 120 can be a computer disposed beside any of the machine tools 50 and 52. In this embodiment, as shown in FIG. 1, the thermal compensation-monitoring device 120 is disposed beside the machine tool 52. The temperature-sensing device 110, signally connected with the other measuring devices, including a signal-processing unit 121, a memory unit and a communication unit (both not shown in the figure), is configured to receive and capture a plurality of temperature characteristics of the temperature signals, and further to evaluate the received tolerance data to build a thermal compensation database 122. The database 122 can record the temperature characteristics, the tolerance data, and also identification data of the machine tool 52 such as the machine model and the location.

The cloud calculation device 130, signally connected with the thermal compensation-monitoring device 120, can be a far-end computer, and includes a processing unit, a memory unit and a communication unit (not shown in the figure). In another embodiment, the cloud calculation device 130 can integrate the thermal compensation-monitoring device 120 to form a near-end computer equipment. The cloud calculation device 130 is configured to receive the temperature characteristics and the tolerance data EA, and build, use or modify a thermal compensation model MA for generating thermal compensation values according to all the data in the thermal compensation database 122. These thermal compensation values are further sent back to the thermal compensation-monitoring device 120, and the the controller 52A would evaluate these thermal compensation values to calibrate the machine tool 52. To the far-end machine tool 50 with the same model, machining process and environmental temperature, the same thermal compensation value would prevail as well. In this disclosure, the aforesaid communication unit can be a cable or wireless bidirectional communication unit.

Upon such an arrangement, the thermal compensation system 100 can perform the same thermal compensation process in a real-time manner to all the machine tools of the same model at different sites according to a machining situation of one of these machine tools of this model. In addition, according to this disclosure, the established thermal compensation models for these individual machine tools MA can be modified anytime. Thereupon, the problem that the machine tools sold to different regions can be maintained individually only in an on-site adjustment manner with specific instruments, equipment and hired special personnel can be solved.

In one embodiment, the thermal compensation-monitoring device 120 can further include a user interface 124 for providing various messages to a user for determining instructions to perform the receiving and processing of the temperature signals and the tolerance data, to initiate the building or updating of the thermal compensation database 122, and to start signal connections with the cloud calculation device 130.

Figure 2:
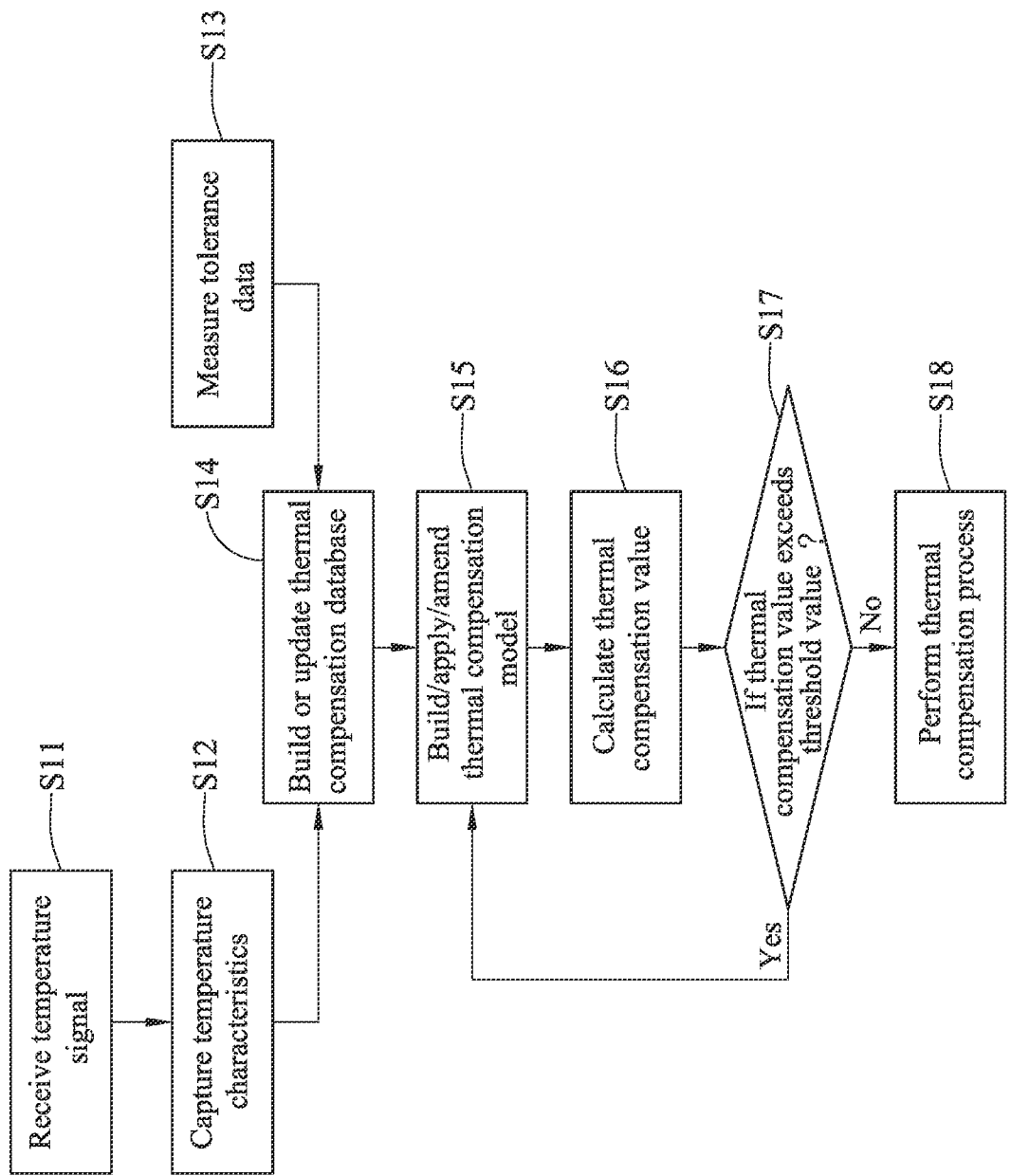
FIG. 2 is a schematic flowchart to run the thermal compensation system for machine tools of FIG. 1 in accordance with this disclosure.

Referring to FIG. 2, a schematic flowchart to run the thermal compensation system for machine tools of FIG. 1 in accordance with this disclosure is listed. As shown, in Step S11, the temperature-sensing device 110 receives a plurality of temperature signals at different timings while the machine tool 52 is machining the workpiece. Then, in Step S12, after the signal-processing unit 121 receives the temperature signals and further reduces the noise level by an appropriate signal processing method, the temperature characteristics in the temperature signals can be realized and thus captured. In Step S13, the measuring device measures the tolerance data EA of machining dimensions of the workpiece at different timings. For example, a measurement reference is set to the first cut at the workpiece for model building at the first timing, and then each of the following timings would execute a measurement at the cut upon the workpiece, and the tolerance data EA at the specific timing are obtained by comparing the measurements of the instant timing and that of the first timing. Thus, during the machining process, various temperature characteristics can be continuously generated at different timings, and then plenty of tolerance data EA at the timings can be calculated for building or updating the thermal compensation database 122, as shown in Step S14.

Then, in Step S15, the cloud calculation device 130 would input the temperature characteristics at different timings, and output the calculated tolerance data at corresponding timings. For example, the neural network algorithm can be introduced to build the thermal compensation model MA. Namely, in this disclosure, an algorithm of the machine learning is utilized to build the thermal compensation model MA, but not limited thereto.

In one exemplary example of this disclosure, an equation for building the thermal compensation model MA can be:

$$Y=f_k(\Sigma_{i=1}X_iW_i+b) \quad (1);$$

in which $X_i$ is the i-th temperature signal while machining the workpiece for modeling measurement, y is the measurement tolerance, $f_k$ is a transfer function or a transitive function, $W_i$ is the i-th vector, and b is a biased constant. With $f_k$, $W_i$ and b to be given, the thermal compensation value would be the y value after inputting all the $X_i$.

In one embodiment, Step S15 can further include a step of modifying the thermal compensation model MA through a cloud calculation. The cloud calculation device 130 would evaluate the temperature characteristics in the thermal compensation model MA to calculate and compare the corresponding thermal compensation values and the tolerance data of the workpiece for model building so as further to calibrate or modify the established thermal compensation model MA to be an updated thermal compensation model MA.

Obviously, according to this disclosure, the relationship between the processing time and the thermal elongations or tolerances of the workpiece for model building is utilized to build the thermal compensation model MA, and the neural network is utilized for model modification, such that the thermal compensation model MA can be continuously updated to form a more precise thermal compensation value.

In one embodiment, the modification upon the thermal compensation model MA can utilize the aforesaid equation (1), and the cloud calculation can be integrated to perform the tolerance measurement upon the workpiece for model building, such that sufficient data for the thermal compensation model MA can be provided to improve the machining precision continuously.

Then, in Step S16, after the cloud calculation device 130 receives and compares the temperature characteristics, the tolerance data and the data in the thermal compensation database 122 for the workpiece for model building at different timings, a corresponding thermal compensation value can be calculated according to the thermal compensation model MA. Then, in Step S17, it is determined whether or not the thermal compensation value exceeds a preset threshold value. If positive, then it implies that the tolerance is too large, and thus go back to Step 15 for performing model modification and re-calculation. On the other hand, if negative, then it implies that the instant thermal compensation value doesn't exceed the threshold value, and the following thermal compensation process can be performed normally and continuously. Referring to FIG. 1, in Step S18, the threshold value can be set to be the minimum control precision of the controller of the machine tool, 1 μm for example. After the calculation is performed through the thermal compensation model MA, if the thermal compensation value doesn't exceed the threshold value, then the cloud calculation device 130 would perform calibration automatically, and the calculated thermal compensation value for calibration processes would be further transmitted to the machine tools 52, 50 by the near-end controller 52A or the far-end controller 50, respectively. Thereupon, the machining precision of workpieces by the machine tools of the same model at different sites can be stably and continuously controlled. In some locations, the machine tools 50 may be equipped with CNC controllers or PLC systems, and then the thermal compensation value can be directly transmitted to these the machine tools for performing compensation.

In summary, the thermal compensation system for machine tools provided in this disclosure can perform online the thermal compensation in a real-time manner according to the instant local machining conditions, and the established neural network thermal compensation model can be continuously modified as well. Thereupon, in the case that the machine tools are sold to different regions, the problem of specific instruments, equipment and special personnel required for remodeling can be resolved.

Further, according to this disclosure, the relationship between the processing time and the thermal elongations or tolerances of the workpiece for model building is utilized to build the thermal compensation model, and the neural network is utilized for model modification, such that the thermal compensation model can be continuously updated to produce a more precise thermal compensation value.

In addition, after the thermal compensation model calculates the thermal compensation value, if this value doesn't exceed the preset threshold value, then the cloud calculation device can perform automatic calibration to execute the thermal compensation process, so that the machining precision of the machine tools of the same model but at different sites can be stably and continuously controlled.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A thermal compensation system, applied to a machine tool for processing a workpiece, comprising:
   a thermal compensation-monitoring device, configured to receive a plurality of temperature signals of the workpiece at different timings, to capture a plurality of temperature characteristics corresponding to the plurality of temperature signals, and to build or update a thermal compensation database according to a plurality of tolerance data of the workpiece corresponding to the plurality of temperature characteristics; and
   a cloud calculation device, configured to provide a thermal compensation model, to calculate a thermal compensation value according to the plurality of temperature characteristics and the plurality of tolerance data, and to evaluate the thermal compensation value and a preset threshold value and then determine to modify the thermal compensation model or to perform a thermal compensation process;
   wherein the threshold value is a minimum control precision of a controller of the machine tool.

2. The thermal compensation system of claim 1, wherein the plurality of temperature signals are measured values by a temperature-sensing device.

3. The thermal compensation system of claim 1, wherein the thermal compensation model is modified upon when the thermal compensation value is greater than the threshold value, and the thermal compensation process is performed upon when the thermal compensation value is equal to or less than the threshold value.

4. The thermal compensation system of claim 1, wherein the thermal compensation process is a process to transmit the thermal compensation value to the machine tool.

5. The thermal compensation system of claim 1, wherein the plurality of tolerance data are obtained through measuring of a measuring device.

6. The thermal compensation system claim 1, wherein the thermal compensation database is further recorded with identification data of the machine tool.

7. The thermal compensation system of claim 1, wherein the cloud calculation device utilizes a neural network algorithm to build the thermal compensation model according to the plurality of temperature characteristics and the plurality of corresponding tolerance data.

8. The thermal compensation system of claim 7, wherein the cloud calculation device utilizes the neural network algorithm to modify the thermal compensation model.

9. The thermal compensation system of claim 1, wherein the cloud calculation device utilizes a communication unit to signally connect the thermal compensation monitoring device.

10. The thermal compensation system of claim 9, wherein the cloud calculation device utilizes the communication unit to signally connect the machine tools.

* * * * *